US010974991B2

(12) United States Patent
Hanf et al.

(10) Patent No.: US 10,974,991 B2
(45) Date of Patent: Apr. 13, 2021

(54) DEVICE FOR COATING A FIBER AND A METHOD FOR COATING A FIBER AND A FIBER

(71) Applicant: J-FIBER GMBH, Jena (DE)

(72) Inventors: Robert Hanf, Eisenberg (DE); Lothar Brehm, Jena (DE); Juergen Rosenkranz, Jena (DE)

(73) Assignee: J-FIBER GMBH, Jena (DE)

( * ) Notice: Subject to any disclaimer, the term of this patent is extended or adjusted under 35 U.S.C. 154(b) by 596 days.

(21) Appl. No.: 15/381,119

(22) Filed: Dec. 16, 2016

(65) Prior Publication Data

US 2017/0190614 A1 Jul. 6, 2017

(30) Foreign Application Priority Data

Jan. 5, 2016 (DE) .................... 10 2016 100 144.9

(51) Int. Cl.
*C03C 25/6226* (2018.01)
*B05B 13/02* (2006.01)
*C03C 25/1065* (2018.01)
*C03C 25/106* (2018.01)
*C03C 25/14* (2018.01)
*B05D 3/06* (2006.01)
(Continued)

(52) U.S. Cl.
CPC ...... *C03C 25/6226* (2013.01); *B05B 13/0214* (2013.01); *C03C 25/106* (2013.01); *C03C 25/1065* (2013.01); *C03C 25/14* (2013.01); *B05D 3/0466* (2013.01); *B05D 3/067* (2013.01); *B05D 2256/00* (2013.01); *C03C 2213/00* (2013.01); *C03C 2218/112* (2013.01); *G02B 6/02395* (2013.01)

(58) Field of Classification Search
USPC .................. 118/300, 313–315, 325, 641–643
See application file for complete search history.

(56) References Cited

U.S. PATENT DOCUMENTS 4,125,644 A 11/1978 Ketley et al.
4,591,724 A 5/1986 Fuse et al.
(Continued)

FOREIGN PATENT DOCUMENTS

CN 103319100 A 9/2013
DE 39 35 777 A1 5/1991
(Continued)

*Primary Examiner* — Yewebdar T Tadesse
(74) *Attorney, Agent, or Firm* — Norman B. Thot

(57) ABSTRACT

A device for coating a fiber includes a fiber receiving arrangement and a coating arrangement which includes an application unit which wets the fiber with a coating agent, and a curing unit arranged downstream of the application unit which optically cures the coating agent. The curing unit includes a lamp which emits at least one light beam which is aimed directly or indirectly at a surface of the fiber. A main radiation direction of the lamp includes a beam angle between the main radiation direction and a longitudinal direction of the fiber of less than 40°. The fiber receiving arrangement and the application unit are movable relative to each other in the longitudinal direction of the fiber via a translational motion arrangement so that a wetting process is implemented substantially along an entire length of the fiber.

13 Claims, 2 Drawing Sheets

(51) Int. Cl.
  *B05D 3/04*     (2006.01)
  *G02B 6/02*     (2006.01)

(56) References Cited

U.S. PATENT DOCUMENTS

| | | | |
|---|---|---|---|
| 4,849,640 A * | 7/1989 | Kruishoop | G02B 6/4298 |
| | | | 250/492.1 |
| 5,092,264 A * | 3/1992 | Overton | B01J 19/123 |
| | | | 118/50.1 |
| 5,733,607 A | 3/1998 | Mangum et al. | |
| 6,338,878 B1 | 1/2002 | Overton et al. | |
| 6,463,872 B1 | 10/2002 | Thompson | |
| 7,022,382 B1 | 4/2006 | Khudyakov et al. | |
| 7,322,122 B2 * | 1/2008 | Overton | B05D 3/0209 |
| | | | 34/61 |
| 2002/0012252 A1 | 1/2002 | Carter et al. | |
| 2003/0039749 A1 | 2/2003 | Overton et al. | |
| 2004/0135159 A1 | 7/2004 | Siegel | |
| 2005/0053785 A1 * | 3/2005 | Andrieu | C03C 25/106 |
| | | | 428/375 |
| 2009/0241788 A1 | 10/2009 | Leenders et al. | |
| 2010/0183821 A1 | 7/2010 | Hartsuiker et al. | |
| 2011/0147356 A1 | 6/2011 | Leonhardt et al. | |
| 2011/0159178 A1 * | 6/2011 | Haslov | B05D 3/066 |
| | | | 427/162 |
| 2011/0287195 A1 * | 11/2011 | Molin | B05D 3/067 |
| | | | 427/595 |
| 2012/0009358 A1 | 1/2012 | Gharbi et al. | |
| 2012/0040105 A1 | 2/2012 | Overton | |
| 2013/0068969 A1 | 3/2013 | Childers | |
| 2013/0228707 A1 | 9/2013 | Nieminen | |
| 2015/0028020 A1 * | 1/2015 | Childers | H05B 3/0038 |
| | | | 219/553 |

FOREIGN PATENT DOCUMENTS

| | | |
|---|---|---|
| DE | 601 04 351 T2 | 8/2005 |
| EP | 1 138 642 A1 | 10/2001 |
| EP | 2 792 422 A1 | 10/2014 |
| JP | H0925140 A | 1/1997 |
| WO | WO 97/28195 A1 | 8/1997 |
| WO | WO 2008/034810 A2 | 3/2008 |
| WO | WO 2010/077132 A1 | 7/2010 |

* cited by examiner

DEVICE FOR COATING A FIBER AND A METHOD FOR COATING A FIBER AND A FIBER

CROSS REFERENCE TO PRIOR APPLICATIONS

Priority is claimed to German Patent Application No. DE 10 2016 100 144.9, filed Jan. 5, 2016. The entire disclosure of said application is incorporated by reference herein.

FIELD

The present invention relates to a device for coating a fiber which includes a fiber receiving arrangement and a coating arrangement, which comprises an application unit for wetting the fiber with a coating agent, and a curing unit (hereinafter also referred to as a hardening unit) arranged downstream of the application unit for optically curing the coating agent, wherein the fiber receiving arrangement and the application unit can be subjected to a movement relative to each other in the longitudinal direction of the fiber via a translational motion arrangement so that the wetting process is implemented substantially along the entire fiber, and the hardening unit comprises a lamp for emitting at least one light beam, wherein the at least one light beam is aimed directly or indirectly at a surface of the fiber. The present invention also includes a method for manufacturing a coated fiber and a fiber.

BACKGROUND

Curing coatings of fibers via electromagnetic radiation has previously been described. In particular when manufacturing glass fibers, the coating protecting the fiber is cured with UV radiation. The person skilled in the art knows the following methods and devices for carrying out the curing process in the most optimal way.

US 2011/147356 A describes the use of an LED array whose radiation is focused onto the fiber by a cylindrical lens. A reflector is attached to the other side of the LED array in order to provide a homogeneous and efficient irradiation. The person skilled in the art can also gather the idea of combining a cylindrical lens with a reflector from U.S. Pat. No. 7,022,382 B1.

US 2011/287195 A describes an apparatus in which LEDs are disposed inside a tube protecting the fiber, the tube having an elliptic shape and being provided with a coating in order to achieve a focus onto the fiber.

U.S. Pat. No. 4,591,724 describes an elliptic reflector in combination with an air cooler.

US 2013/068969 describes how to achieve a more homogeneous exposure, and thus a more homogeneous curing, of the coating by using two elliptic reflectors.

US 2004/135159 A describes that several LEDs can be combined into a panel, and that the formation of hot spots can be avoided by using different wavelengths and a possible relative movement between the fiber and the LED array.

Using different wavelengths for curing a coating is also described in US 2013/228707 A. US 2012/009358 A similarly describes a curing process using different wavelengths. This publication also describes that the coating can cool down and thus be relieved by not irradiating specific regions.

US 2012/040105 A describes a method in which curing is carried out with a number of LED arrays. The output of the individual LEDs is varied in the process, the total output for curing the coating being kept constant. The intensity of the LEDs is in particular changed depending on the draw speed.

EP 2792422 A describes a device, which dispenses with reflectors for homogeneous irradiation. Several LED panels are instead used which are arranged circumferentially around the fiber and thus provide a homogeneous irradiation. By dispensing with a reflector and the necessity of positioning the radiation sources in its focal point, the LED panel can also be brought considerably closer to the fiber, which results in an improved curing process.

US 2003/039749 A describes that a distance between the individual radiation sources is advantageous during curing, whereby the coating is thus subjected to less stress and the curing process can take place at an optimal curing temperature. The properties of the coating are thus improved.

In order to more efficiently use the radiation of the radiation sources, US 2004/090794 A describes a device with which the radiation is formed and then coupled into a fiber. The intensity of the radiation for curing can thereby be increased.

CN 103319100 A describes the advantages of curing with an LED as a radiation source since increased energy efficiency, longer lamp service lives, and a lower thermal stress can thus be achieved.

US 2010/183821A describes a device in which pairs of LED/reflectors are disposed in a helical structure around the fiber. The LEDs are also provided with a semi-transparent layer which is able to reflect light that has not been absorbed by the coating.

The solutions used in the prior art are based on one or several radiation sources whose radiation spreads perpendicularly to the direction of movement of the fiber. In order to increase efficiency, this radiation is concentrated by an optical device and focused onto one point on the fiber.

A protective tube is also often arranged between the fiber and the radiation source, the tube being flushable with a fluid in order to cool the fiber and/or the radiation source and to keep impurities, which form during curing of the coating, away from the radiation source. This results in a number of disadvantages.

Due to the vertical radiation direction, a large part of the light intensity is bundled in one point (or at least a small section of the fiber) so that this point is subjected to high stress. The one-sided irradiation results in an irregular curing of the coating.

The radiation must be also guided by the arrangement of the radiation source and the protective tube through the protective tube. This leads to losses, in particular when the protective tubes are contaminated during the drawing of the fibers.

The installation and removal of the protective tube is also complex since the protective tubes are located between the fiber and the radiation source and must therefore be threaded into and pulled out of the intermediate space between the radiation source and the fiber in order to avoid damage to the radiation source.

The radiation sources must also be positioned close to the fiber. The gas flushing process must therefore meet higher requirements and the packing density of the LEDs cannot be increased as needed.

SUMMARY

An aspect of the present invention is to improve on the prior art, in particular to provide a device in which the distance between a light-emitting diode and a fiber can be increased so that the installation and removal of radiation sources, such as the light-emitting diode, can be facilitated and the emitted output of the radiation source can be applied onto a greater section of the fiber.

In an embodiment, the present invention provides a device for coating a fiber which includes a fiber receiving arrangement and a coating arrangement comprising an application unit configured to wet the fiber with a coating agent, and a curing unit arranged downstream of the application unit which is configured to optically cure the coating agent. The curing unit comprising a lamp which is configured to emit at least one light beam which is aimed directly or indirectly at a surface of the fiber. A main radiation direction of the lamp comprises a beam angle between the main radiation direction and a longitudinal direction of the fiber of less than 40°. The fiber receiving arrangement and the application unit are configured to be movable relative to each other in the longitudinal direction of the fiber via a translational motion arrangement so that a wetting process is implemented substantially along an entire length of the fiber.

BRIEF DESCRIPTION OF THE DRAWINGS

The present invention is described in greater detail below on the basis of embodiments and of the drawings in which.

DETAILED DESCRIPTION

Figure 1:
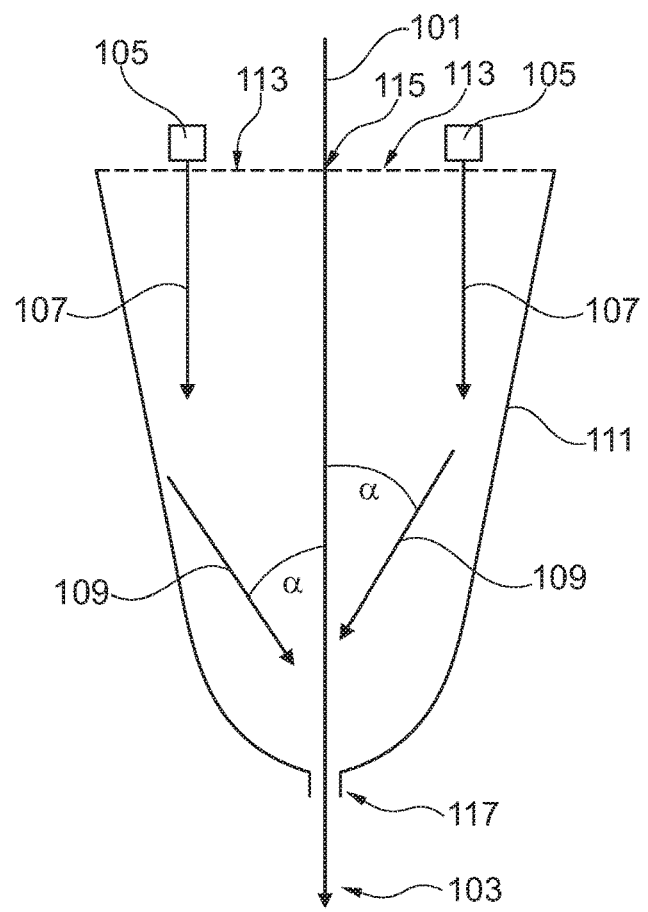
FIG. 1 shows a highly schematic sectional view of a vertically arranged reflector through which a glass fiber is pulled.

In an embodiment, the present invention provides a device for coating a fiber with a fiber receiving arrangement and a coating arrangement, which comprises an application unit for wetting the fiber with a coating agent, and a curing unit disposed downstream of the application unit for optically curing the coating agent, wherein the fiber receiving arrangement and the application unit can be subjected to a movement relative to each other in the longitudinal direction of the fiber via a translational motion arrangement so that the wetting process is implemented substantially along the entire fiber, and the curing unit comprises a lamp for emitting at least one light beam, wherein the at least one light beam is aimed directly or indirectly at a surface of the fiber, and a main radiation direction of the lamp has a beam angle α between the main radiation direction and the longitudinal direction of the fiber<40°, <30°, <22°, <12° or <8°, or the main radiation direction and the longitudinal direction are parallel to each other.

The installation and removal of lamps, such as, for example, LEDs, can thus be facilitated. The heat output applied by the lamp can be applied across a larger area of the fiber extending in the longitudinal direction since the focal point of the light source and/or a light beam of the light source extends at least partially along the longitudinal direction of the fiber. The fiber, in particular the applied and cured sheath (also referred to as a coating) is thus less strongly heated by the lamps. An increased total intensity can alternatively be used so that the duration of the curing process can be reduced. An increased draw speed of the fiber can, in particular, thus be achieved.

A more uniform irradiation of the surface of the fiber can thus be provided which leads to the formation of a more homogeneous protective layer of the cured coating agent. More compact installations can also be provided since a less complex structure of the entire drawing installation can be achieved through the arrangement of the lamp, the lamp being placed at a distance from the reflector, for example, above the reflector and more specifically in the easily accessible area between the fiber receiving arrangement and the coating arrangement.

The following terms must be explained.

A "fiber" generally refers to a structure that is thin in relation to its length and is, in particular, flexible. This structure can consist, for example, of a fibrous material. In the present application, a fiber has at least a ratio between its length and its diameter of 3:1 or of 10:1, 1,000:1 or even 1,000,000:1. The fibers more specifically include one or several structures made of glass fibers, textile fibers and/or metallic fibers, which can also be referred to as wires or metal sheets. The fiber can also have a circular, oval, square or rectangular or any other geometrical cross-sectional shape. In particular in a case in which a glass fiber is used, the present device can additionally produce the fiber, for example, by drawing.

The term "coating" must also be understood as a sheath. Production methods according to DIN 8580, which include coating, are in particular included. In the process, a firmly adhering layer of a shapeless material can be applied onto the surface of the fiber. The process of applying the (protective) layer itself is referred to as coating. A single thin layer or a thick layer can in particular be applied during coating. It is also possible to implement several contiguous layers. The present application in particular includes coating methods in which the solid coating is formed due to the application of light onto the coating agent.

Fluid, dissolved or solid materials such as, for example, powder can be used as a "coating agent". The coating agent can additionally react to different wavelengths with a different degree of cross-linking, thereby respectively forming the coating.

The "fiber receiving arrangement" is in particular the device into which the fiber is placed or clamped. In so doing, the fiber can more specifically be freely guided in order for the fiber to be treatable, for example, with the coating agent around its entire circumference. The coating agent can in particular be applied onto the fiber in the free clamped area, for example, by a nozzle or several nozzles. The fiber receiving arrangement can, for example, consequently include rollers onto which and from which the fiber is wound and unwound. In order to manufacture and coat glass fibers, for example, quartz glass fibers, the fiber receiving device in particular includes a mount holding a preform. A heat source can also be provided which heats up at least a part of the preform so that the material has such a low viscosity that a drop is formed due to gravity. The material can be freely guided and coated before being wound onto a reel in the subsequent part of the fiber receiving arrangement by a winding unit, which consists, as a rule, of a number of rollers. In the process, it is possible, in another embodiment, to pull off the heated part of the preform via a mechanical device and thus to assist the dripping. This is more specifically advantageous when the final fiber diameter exceeds a value of 600 µm.

The "coating arrangement" is the unit that implements the coating process. As has already been explained, it can include nozzles which apply the actual coating agent onto the fiber. In the present application, the arrangement is, in this case, referred to as an "application unit", in particular with regard to the application of the coating agent.

The actual hardening or corresponding curing can be carried out by a "hardening unit" both directly during the application and subsequently. The term "subsequently" can be understood in this regard both as a downstream location and as a later time.

The "hardening unit" includes a "lamp", which causes the "optical hardening" of the applied coating agent. In this regard, lamps can, for example, be used which emit a wavelength of below 400 nm. It is also possible to use lamps with a wide spectrum, such as, for example, white light LEDs. The advantage thereof is that different coating agents can be used with the same lamp or that the cross-linking of the molecules forming the protective layer can be brought about at different wavelengths.

"Wetting" the fibers in particular refers to the process of sticking the actual coating agent onto the fiber.

The device can comprise a translational motion arrangement in order to be able to provide the fiber with a protective layer over substantially its entire longitudinal extension. This "translational motion arrangement" can be implemented substantially through two alternatives. According to the first alternative, the coating arrangement and in particular the application unit is displaced relative to the fiber along the longitudinal direction of the fiber. According to the second alternative, which can, for example, be implemented with optical or textile fibers, the fiber itself can move in the longitudinal direction relative to the application unit. This can be implemented, for example, while winding and unwinding the fiber onto and from a roller and performed by the application unit. It is also possible to implement combinations of the two alternatives.

In the present application, directional lamps such as, for example, LEDs (light-emitting diode) are more specifically used as "lamps". It is also possible to use lasers or lamps with other configurations, for example, provided with blinds. Using LEDs is particularly advantageous since they are highly durable and very energy efficient. It is advantageous to use LEDs since they feature, for example, club-shaped beam geometries and thus inherently implement a certain distribution of the intensity on the surface of the fiber.

A "direct" orientation of the light beam in particular refers to when the light beam is applied onto the fiber substantially without hindrance after having been emitted by the lamp.

An "indirect" orientation of the light beam refers, for example, to a deflection or modification of the light beam by optical elements after having been emitted by the lamp.

A "main radiation direction" is in particular to be understood as the direction of the light beam in which the light beam is emitted immediately after the lamp so that the highest intensity of the light beam generally predominates along this direction. This direction is an imaginary straight line from the lamp to the focal point in an ideal point-shaped lamp.

A "beam angle $\alpha$" is in particular the smallest angle formed between the main radiation direction and the longitudinal direction of the fiber. A round angle of 360° is used as a basis for angle measurements in the present application.

In an embodiment of the present invention, the device can, for example, comprise an optical element which is arranged on an axis along the lamp so that a translation, refraction, diffraction, focalization and/or reflection of the light beam can be implemented.

A great variety of implementations of the direct or indirect orientation of the light beam onto the surface of the wetted fiber can thus be implemented. A translation more specifically includes an offset of the direction of the light beam, a refraction, in particular a wavelength-dependent deflection of a light beam. A "diffraction" refers to a special distribution of the emitted light beams implemented, for example, by way of blinds and a "focalization", which can be implemented, for example, by lenses or mirrors. It is also possible to implement reflections and thus transmissions of the light.

Reflectors, optical lenses, optical gratings and/or polarization filters can in particular be used separately or in combination with each other as optical elements. Other optical elements, such as are implemented, for example, in an LCD (liquid crystal display) mask, are also included.

The device can be arranged so that the fiber is guided through the optical element in order to be able to irradiate the fiber along its entire circumference with the emitted light.

In a glass fiber, a reflector can, for example, comprise a reflector entrance and a reflector exit through which the fiber is initially pulled and subsequently wound, for example, onto a downstream roller. Something similar can be done with a lens having a hole in its middle through which the fiber is guided.

In an embodiment of the present invention, the device can, for example, be arranged so that an intensity and/or a wavelength of the light beam can be applied homogenously and/or non-homogeneously by the optical element in the longitudinal direction along the fiber onto the surface of the fiber.

A cylindrical lens which transforms a point-shaped light source into a linear light source can, for example, be used. In so doing, this line shape can be applied laterally along the fiber so that, for example, a variably decreasing or increasing intensity forms along the fiber. Something similar can be implemented, for example, with a reflector. When, for example, two coating agents are applied onto the fiber, the deeper layer can be exposed to a different wavelength than the upper layer.

It has proven advantageous to use an internally coated reflector through which the fiber is passed. The reflector can have a conical shape which tapers or widens along the longitudinal direction of the fiber.

Curing light can thus be applied along the entire length of the reflector onto the wetted fiber.

In an embodiment of the present invention, the lamp can, for example, include several light sources, in particular LEDs (light-emitting diodes).

A gassing device can be provided in order to avoid a reaction between the evaporated coating agent and an internal coating of the reflector, or in order to prevent oxidation processes in the protective layer of the fiber, to which a protective gas is assigned and which is substantially disposed in an area of the fiber in which the light beam hits the surface of the fiber. A protective gas atmosphere can thus be provided. In the process, the gassing device can either introduce the protective gas into the reflector under pressure or aspirate the protective gas out of the reflector under a negative pressure. A combination in which the protective gas is introduced under pressure at the bottom end of the reflector and aspirated at the top end under a negative pressure is particularly advantageous.

It has proved particularly advantageous if the gassing device is associated with the reflector so as to establish the protective gas atmosphere in the inner area of the reflector. Noble gases such as argon or inert gases such as nitrogen can, for example, be used as protective gasses.

In a simple implementation, the wetted fiber is permanently exposed to a protective gas from a nozzle during curing. The entire curing process can also take place in a room which is completely filled with the protective gas.

The device can comprise two or several application units or hardening units in order to apply several different protective layers onto the fiber or in order to accelerate the curing process.

An adjusting device can be attributed to the optical element in order to be able to act on the optical element during the coating process so that a translational motion, a rotation and/or a tilting of the optical element relative to the longitudinal direction of the fiber can be implemented. This can also be implemented, for example, by carrying out the corresponding movements by an actuator.

In an embodiment, the present invention provides a method for producing a coated fiber, in particular an optical fiber, using the above described device, wherein the fiber is wetted with the coating agent and subsequently cured by optical irradiation.

A fiber, such as, for example, a textile fiber or a glass fiber, can thus be provided onto which a defined and, for example, homogeneous protective layer is applied.

In an embodiment of the present invention, the fiber can, for example, be manufactured directly by the above-described device, wherein the preform is heated up beforehand and is subsequently pulled, in particular, through the reflector.

In an embodiment, the present invention also provides a fiber which is manufactured according to the above-described method.

The invention is hereinafter described in more detail based on exemplary embodiments as shown in the drawings.

A glass fiber 101 is passed vertically through an internally coated quartz reflector 111 through the reflector entrance 115 and through the reflector exit 117 in the fiber drawing direction 103. The drawing of the glass fiber 101 is carried out by known devices.

A spraying arrangement (not shown in the drawings), which serves as a coating arrangement and comprises nozzles, is disposed vertically above the internally coated quartz reflector 111. A liquid coating agent is sprayed onto the glass fiber through these nozzles. The glass fiber 101 enters the internally coated quartz reflector 111 in a state in which it is wetted with the coating agent. Narrow-band or broadband LEDs 105 are disposed in a circle outside and above the internally coated quarts reflector 101. Depending on the selection made, the LEDs 105 emit in the spectral range of 200 nm to 2000 nm or 250 nm to 600 nm or 270 nm to 380 nm. Several LEDs 105 with different spectral ranges can alternatively be combined. The LEDs 105 used are in particular chosen so that different coating agents can be cured without changing the LEDs 105. The main radiation direction 107 of the LEDs 105 have a beam angle α 109 between the main radiation direction 107 and a longitudinal direction of the fiber.

The internally coated quartz reflector 111 is constructed in a rotationally symmetric manner around the fiber drawing direction 103. The internally coated quartz reflector 111 also comprises a quartz disc 113 on the entrance side. Argon is also permanently blown via the quartz disc into openings (not shown in the drawings) which lead into the inner area of the internally coated quartz reflector 111, wherein the argon leaves the internally coated quartz reflector through the reflector exit 117.

The circularly arranged broadband LEDs 105 are disposed so that, in the light emission direction 107, their light is coupled into the internally coated quartz reflector 111 parallel to the glass fiber 101.

The straight propagation along the light emission direction 107 of the light beam emitted by the LEDs 105 is deflected by the internal coating of the internally coated quartz reflector 111 and oriented toward the glass fiber 101.

The glass fiber 101 wetted with the liquid coating agent is cured in the interior space of the internally coated quartz reflector 111 by the UV component of the light of the broadband LEDs.

If one of the LEDs 105 needs to be replaced, it can now simply be removed outside of the reflector and replaced. A displacement or dismantling of the internally coated quartz reflector 111 is here not necessary.

Figure 2:
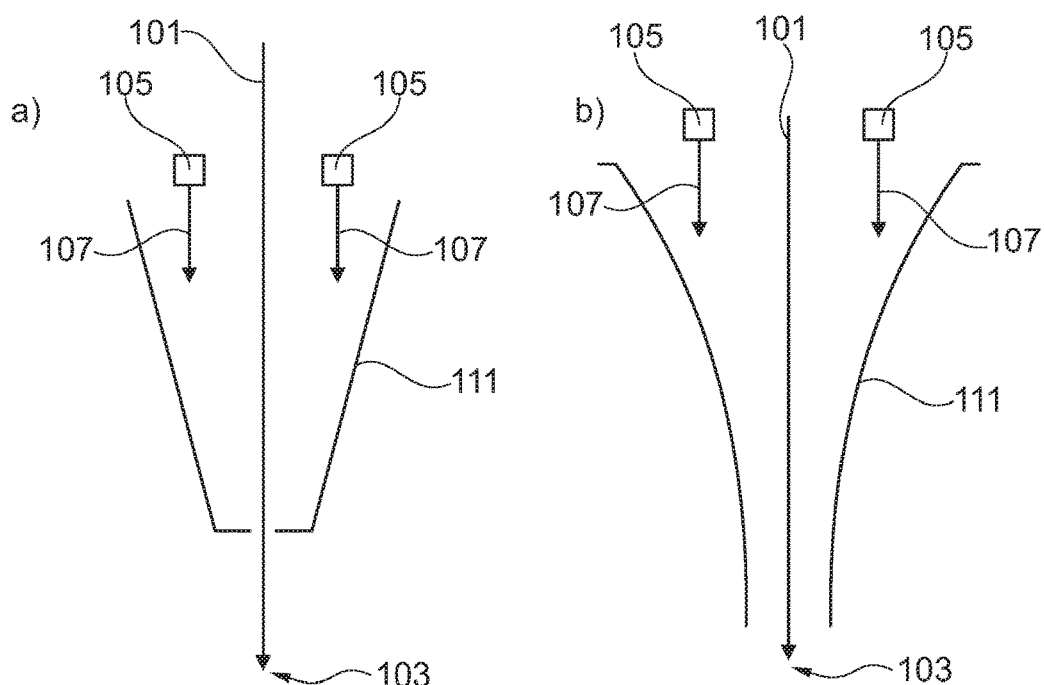
FIG. 2 shows two highly schematic sectional views of alternative embodiments of the reflector of FIG. 1.
Figure 3:
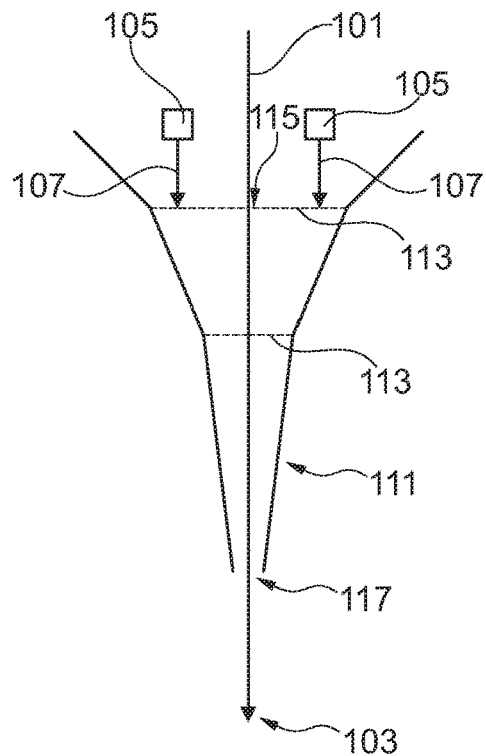
FIG. 3 shows a highly schematic sectional view of another alternative of the reflector of FIG. 1.

The internally coated quartz reflector 111 can be V-shaped (see FIG. 2a)) or funnel-shaped (see FIG. 2b)). The internally coated quartz reflector 111 can also be formed by V-shaped elements disposed close to each other (see FIG. 3).

As an alternative, the glass fiber 101 is first wetted with a first coating agent and subsequently immediately wetted with a second coating agent above the internally coated quartz reflector 111. A prism is disposed directly in front of the LEDs 105 (between the LEDs 105 and the quartz disc 113). This prism breaks the different components of the light emitted by broadband LEDs 105 and focuses them via the internally coated quartz reflector 111 over a wide area of the interior space of the internally coated quartz reflector 111 so that the two coating agents on the glass fiber 101 are cured inside the internally coated quartz reflector 111.

Figure 4:
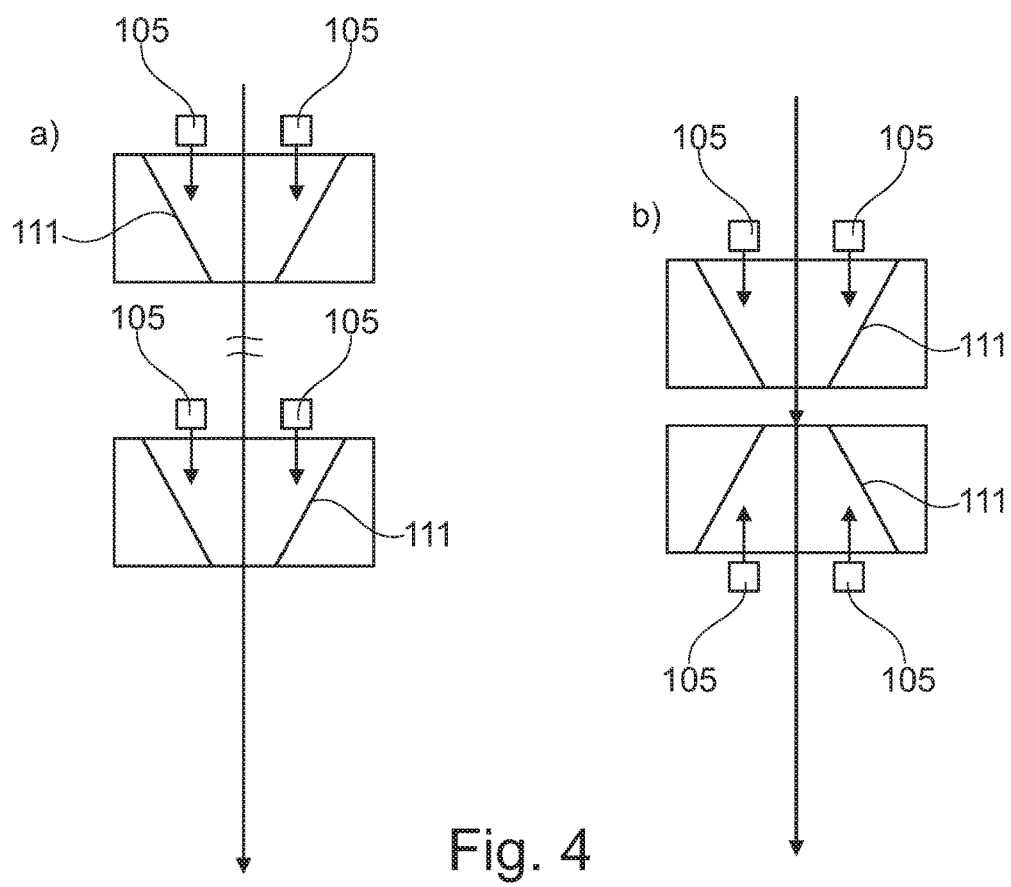
FIG. 4 shows two highly abstract representations of a multi-reflector.

Coating nozzles and associated reflectors can also be subsequently disposed together with an associated LED-broadband source 105 (see FIG. 4a)).

In another alternative, two reflectors are disposed one after another, wherein the tapered components of the V-shaped reflectors are directed toward each other.

The present invention is not limited to embodiments described herein; reference should be had to the appended claims.

What is claimed is:

1. A device for coating a fiber, the device comprising a fiber receiving arrangement and a coating arrangement comprising:
   an application unit configured to wet the fiber with a coating agent; and
   a curing unit arranged downstream of the application unit which is configured to optically cure the coating agent, the curing unit comprising a lamp which is configured to emit at least one light beam which is aimed directly or indirectly at a surface of the fiber, a main radiation direction of the lamp comprising a beam angle between the main radiation direction and a longitudinal direction of the fiber of less than 40°,
   wherein,
   the fiber receiving arrangement and the application unit are configured to be movable relative to each other in the longitudinal direction of the fiber via a translational motion arrangement so that a wetting process is implemented substantially along an entire length of the fiber, and
   the main radiation direction of the lamp is directed parallel to or substantially parallel to the longitudinal direction of the fiber.

2. The device as recited in claim 1, wherein the lamp comprises a beam path, and further comprising an optical element arranged on the beam path of the lamp so as to implement at least one of a translation, a refraction, a diffraction, a focalization and a reflection of the at least one light beam.

3. The device as recited in claim 2, wherein the device is arranged so that the fiber can be passed through the optical element.

4. The device as recited in claim 2, further comprising an adjusting device which is associated with the optical element, the adjusting device being configured to provide at least one of a translational motion, a rotation, and a tilting of the optical element relative to the longitudinal direction of the fiber.

5. The device as recited in claim 2, wherein the optical element comprises at least one of a reflector, an optical lens, an optical grating and a polarization filter.

6. The device as recited in claim 5, wherein the reflector comprises a conical shape which tapers or widens along the longitudinal direction of the fiber.

7. The device as recited in claim 5, further comprising a gassing device comprising a protective gas, the gassing device being arranged substantially in an area of the fiber where the at least one light beam hits the surface of the fiber.

8. The device as recited in claim 7, wherein the gassing device is associated with the reflector so that a protective gas atmosphere can be formed in an inner area of the reflector.

9. The device as recited in claim 2, wherein the device is arranged so that at least one of an intensity and a wavelength of the light beam can be applied at least one of homogenously and non-homogeneously by the optical element in the longitudinal direction along the fiber onto the surface of the fiber.

10. The device as recited in claim 1, wherein the lamp comprises at least one light source.

11. The device as recited in claim 1, wherein the device comprises at least one of,
   at least two application units, and
   at least two curing units.

12. A device for coating a fiber, the device comprising a fiber receiving arrangement and a coating arrangement comprising:
   an application unit configured to wet the fiber with a coating agent; and
   a curing unit arranged downstream of the application unit which is configured to optically cure the coating agent, the curing unit comprising a lamp which is configured to emit at least one light beam which is aimed directly or indirectly at a surface of the fiber, a main radiation direction of the lamp comprising a beam angle between the main radiation direction and a longitudinal direction of the fiber which is always less than 40°,
   wherein,
   the fiber receiving arrangement and the application unit are configured to be movable relative to each other in the longitudinal direction of the fiber via a translational motion arrangement so that a wetting process is implemented substantially along an entire length of the fiber, and
   the main radiation direction of the lamp is directed parallel to or substantially parallel to the longitudinal direction of the fiber.

13. A device for coating a fiber, the device comprising a fiber receiving arrangement and a coating arrangement comprising:
   an application unit configured to wet the fiber with a coating agent; and
   a curing unit arranged downstream of the application unit which is configured to optically cure the coating agent, the curing unit comprising a lamp which is configured to emit at least one light beam which is aimed directly or indirectly at a surface of the fiber, a main radiation direction of the lamp comprising a beam angle between the main radiation direction and a longitudinal direction of the fiber of less than 40°,
   wherein,
   the fiber receiving arrangement and the application unit are configured to be movable relative to each other in the longitudinal direction of the fiber via a translational motion arrangement so that a wetting process is implemented substantially along an entire length of the fiber, and
   the main radiation direction of the lamp is directed parallel to or substantially parallel to the longitudinal direction of the fiber, the main radiation direction of the lamp being a direction of the light beam emitted immediately after the lamp.

* * * * *